June 23, 1959  C. B. CONNELL ET AL  2,891,423
HYDRAULIC CONTROL DEVICE FOR VARIABLE SPEED MECHANISM
Filed May 3, 1955  4 Sheets-Sheet 1

WITNESSES:
E. A. M?Closkey.
John B. Davidson

INVENTORS
Clyde B. Connell
and David L. Moses.
BY
Paul E. Friedemann
ATTORNEY

June 23, 1959  C. B. CONNELL ET AL  2,891,423
HYDRAULIC CONTROL DEVICE FOR VARIABLE SPEED MECHANISM
Filed May 3, 1955  4 Sheets-Sheet 2

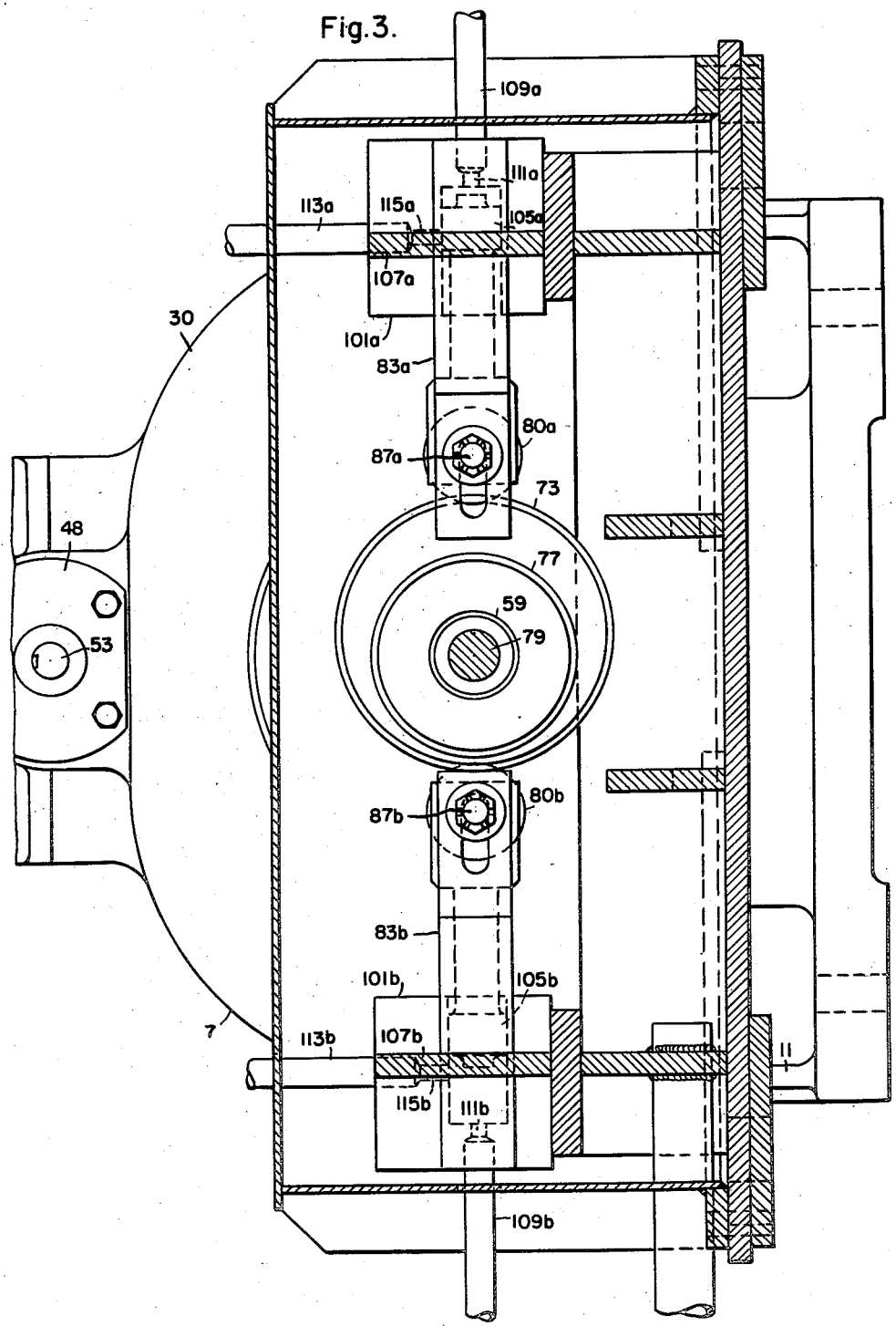

June 23, 1959 C. B. CONNELL ET AL 2,891,423
HYDRAULIC CONTROL DEVICE FOR VARIABLE SPEED MECHANISM
Filed May 3, 1955 4 Sheets-Sheet 4

United States Patent Office 2,891,423
Patented June 23, 1959

2,891,423

HYDRAULIC CONTROL DEVICE FOR VARIABLE SPEED MECHANISM

Clyde B. Connell, Glenshaw, and David L. Moses, Swissvale, Pa., assignors to Westinghouse Electric Corporation, East Pittsburgh, Pa., a corporation of Pennsylvania Application May 3, 1955, Serial No. 505,634

6 Claims. (Cl. 74—786)

This invention relates to variable speed mechanisms and, more particularly, to variable speed mechanisms utilizing a planetary gear drive.

For many industrial applications there exists a requirement for a variable-speed gear-drive by means of which the rotational speed of an output shaft may be continuously varied in relation to the driving shaft from a very small value to a value approaching or equal to the rotational speed of the driving shaft. One application for such a device would be to maintain the output shaft at a constant speed regardless of the load imposed thereupon where the rotational speed of the prime mover, or driving motor, varies over a considerable range with variation in the magnitude of the load. Inasmuch as the speed of the driving motor will vary with the load, the ratio of the input speed to the output speed of the coupling mechanism must be varied if the output shaft is to be maintained at a constant rotational speed.

One means for achieving such a variable speed drive is to provide an auxiliary load on the coupling shaft by means of a band brake and to vary this auxiliary load inversely with variations in the magnitude of the main load. The disadvantage of such a device is that the capacity of the system is limited even though an auxiliary cooling source of large heat dissipating capacity is provided. Also, it has been known to couple an electric generator to the shaft through a pinion gear, and to vary the magnitude of the load on the generator in accordance with the desired shaft speed. Such a system is not particularly desirable, however, because it is necessarily quite large and expensive when practical system capacities are contemplated.

Accordingly, one object of our invention is to provide a variable speed mechanism adapted to provide a continuously variable rotational speed for a given shaft.

Another object is to provide a variable speed mechanism requiring little or no provision for an auxiliary dissipating means for the heat generated thereby.

Still another object is to provide a continuously variable speed mechanism of small dimensions and low cost which can be readily assembled and disassembled.

Other objects and features of our invention will become apparent upon consideration of the following description thereof when taken in connection with the accompanying drawings, wherein:

Fig. 3 is a front sectional view of the apparatus shown in Figs. 1 and 2.

Figure 1:
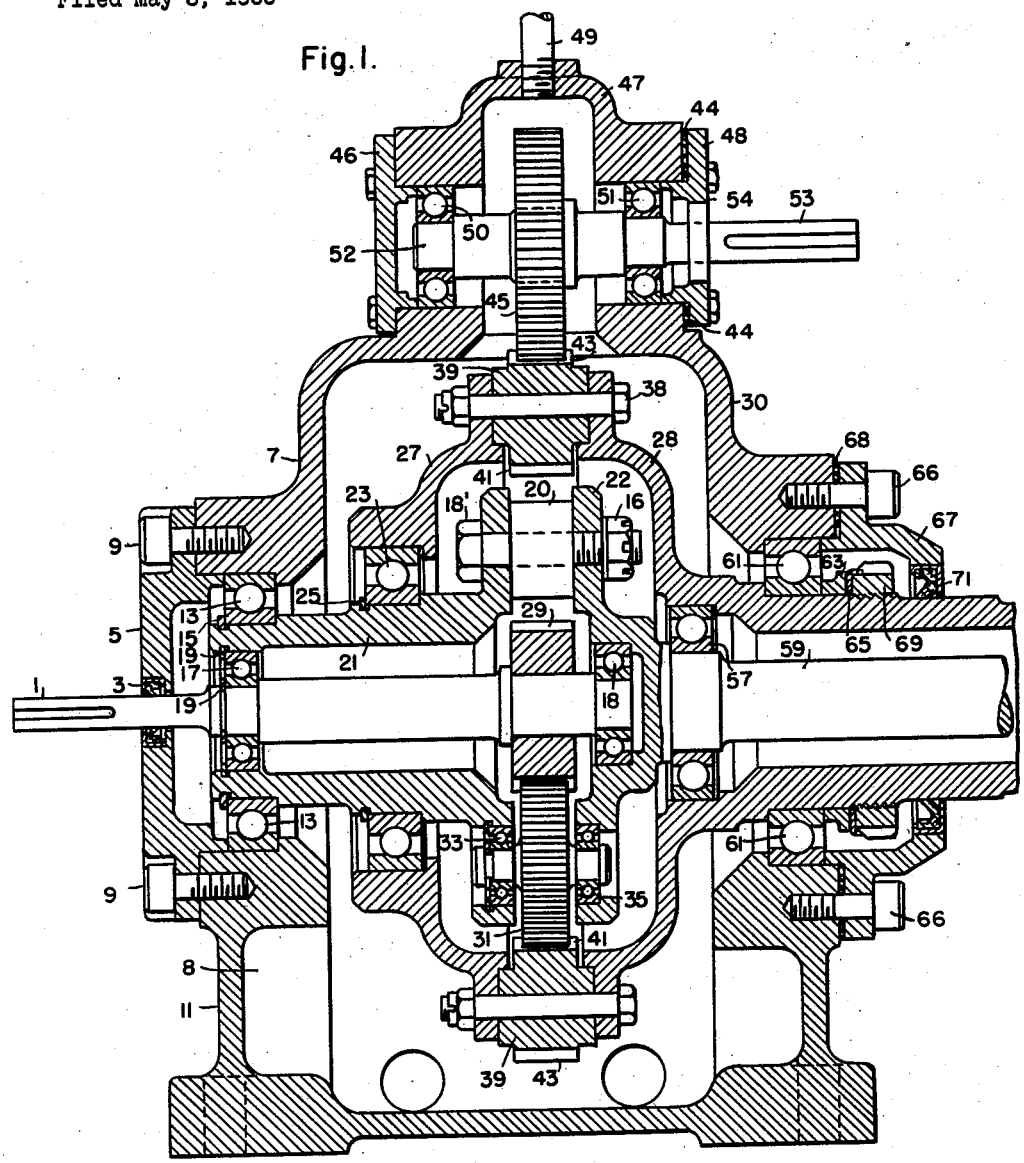
Figure 1 is a side sectional view of a planetary gear mechanism which forms a part of one embodiment of our invention.

In Fig. 1 there is shown a sun gear 29 driving a plurality of planetary gears, one of which is depicted at reference numeral 31, and a ring gear 39 having internal teeth 41 and external teeth 43. The sun gear is driven directly by driven shaft 1 which is supported on opposite sides of the sun gear by ball bearing assemblies 17 and 18. The planetary gear carrier has two sections 21 and 22 which are joined together in spaced relationship by a plurality of spacer members 20, and by means of the bolts 18' and nuts 16. The planetary gears 31 are supported by ball bearing assemblies 33 and 35 which are secured within planetary gear members 21 and 22, respectively. Additionally, the planetary gear carrier members 21 and 22 support the ball bearing assemblies 17 and 18, which ball bearing assemblies are secured in position by snap rings 19.

The entire gearing assembly so far described is enclosed within a casing comprising top casing members 7 and 30, bottom support member 11 and end plate 5. An oil sump 8 is built into member 11. The end plate 5 is secured to casing members 7 and 11 by means of a plurality of bolts 9. A friction type oil seal 3 of neoprene, or a similar oil resistant material, seals driving shaft 1. The left end of the carrier 21 is supported by a ball bearing assembly 13 which is secured to top casing member 7 and bottom support 11 by end plate 5 and snap-ring 15. The other portion of the carrier 22 which is unitary with the output shaft 59 is supported by a ball bearing assembly 57.

Ring gear 39, the inner teeth 41 of which mesh with the teeth of the planetary gears, is supported by ring gear carrier member 27 and extended sleeve 28, rotational support therefor being provided by ball bearing assemblies 23 and 61. Ball bearing assembly 23 is secured in place by snap-ring 25. Ball bearing assembly 61 is wedged against top housing 30 and bottom support member by means of end cap 67. This end cap is secured to the top casing member 30 and bottom support member 11 by means of a plurality of bolts 66 and gaskets 68.

A friction type oil seal 71 provides a seal between end cap 67 and extended sleeve 28. Further, ball bearing assembly 61 is secured into place by means of a spanner nut 69, lock washer 65, and spacer 63.

The outer teeth 43 of ring gear 39 are in mesh with a pinion gear 45, the shaft of which is supported by ball bearing assemblies 50 and 51. Pinion housing 47 is secured to top housing members 7 and 30, by end caps 46 and 48, and a screw-threaded bore is provided at the top thereof so as to receive an oil conduit 49 from which is provided the lubricating oil for the entire gearing assembly. The shaft 52 is provided with an extended portion 53. The purpose of this pinion gear assembly will become evident in connection with Fig. 6.

Figure 2:
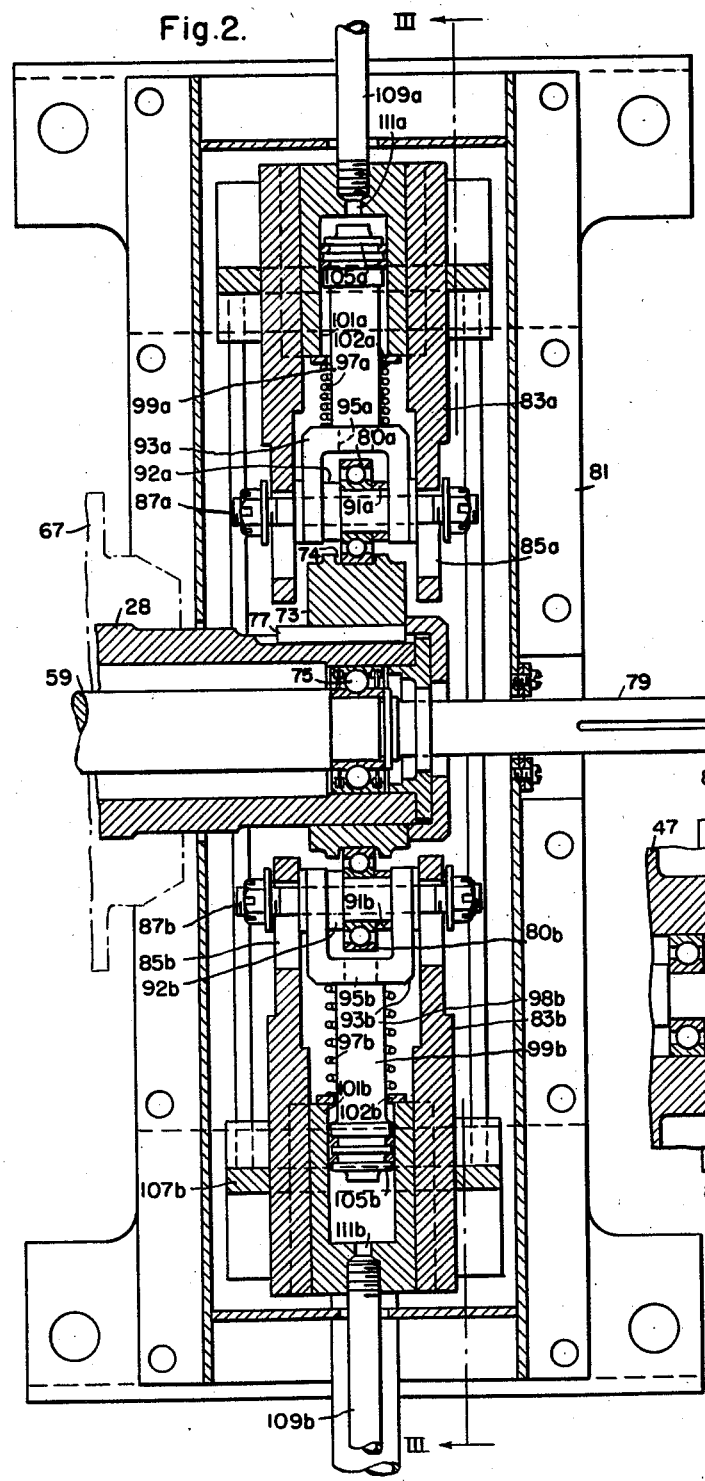
Fig. 2 is a top sectional view of a device which when taken in connection with Fig. 1 forms the aforesaid embodiment of our invention.

With reference now to Figs. 2 and 3, output shaft 59 (which is unitary with planet carrier 22) is supported at the right end thereof by means of a ball bearing assembly 75 between the output shaft and the extended sleeve 28. An eccentric cam 73 having a peripheral groove 74 is secured to the end of the extended sleeve by means of a key 77. A pair of reciprocating pistons 105a, 105b are provided which reciprocate within piston cylinders 101a, 101b. The pistons 105a, 105b are respectively integral with piston rods 99a, 99b, which rods have extended slightly tapered reduced portions 95a, 95b at the ends thereof opposite the pistons. These end sections 95a, 95b respectively fit into bores drilled into the bight of clevis members 93a, 93b. The pistons are preferably in line and oppositely disposed relative to extended sleeve 28, so that they are also in line with the rotational center of the cam.

The clevis members 93a, 93b respectively support a pair of shafts 87a, 87b by the clevis arms; mounted on the shafts are roller bearing members 80a, 80b which are adapted to roll about groove 74 in the periphery of eccentric cam 73. The inner race of the roller bearing assembly is located axially by collars 92a, 92b respectively mounted on shafts 87a, 87b, and by spacer rings 91a, 91b.

The clevis members 93a, 93b are respectively biased against the outer surface of the cam 73 by means of coil springs 97a, 97b which are disposed between the clevis members and spring seats 102a, 102b, which spring seats bear against piston chamber bodies 101a, 101b.

The piston cylinders 101a and 101b are fitted within cylinder housings 83a, 83b, which in turn are provided with slots 85a, 85b through which protrude the ends of shafts 87a, 87b. The ends of shafts 87a, 87b are screw-threaded so as to receive nut and washer assemblies which provide against excessive lateral movement of the roller bearings 80a, 80b.

As shown more perspicuously in Fig. 3, the piston chambers 101a, 101b, are provided with inlet ports 115a, 115b and exhaust ports 111a, 111b. The piston cylinders and the housings associated therewith are drilled so as to receive inlet conduits 113a, 113b and exhaust conduits 109a, 109b in fluid communication with the inlet ports and exhaust ports respectively.

Figure 4:
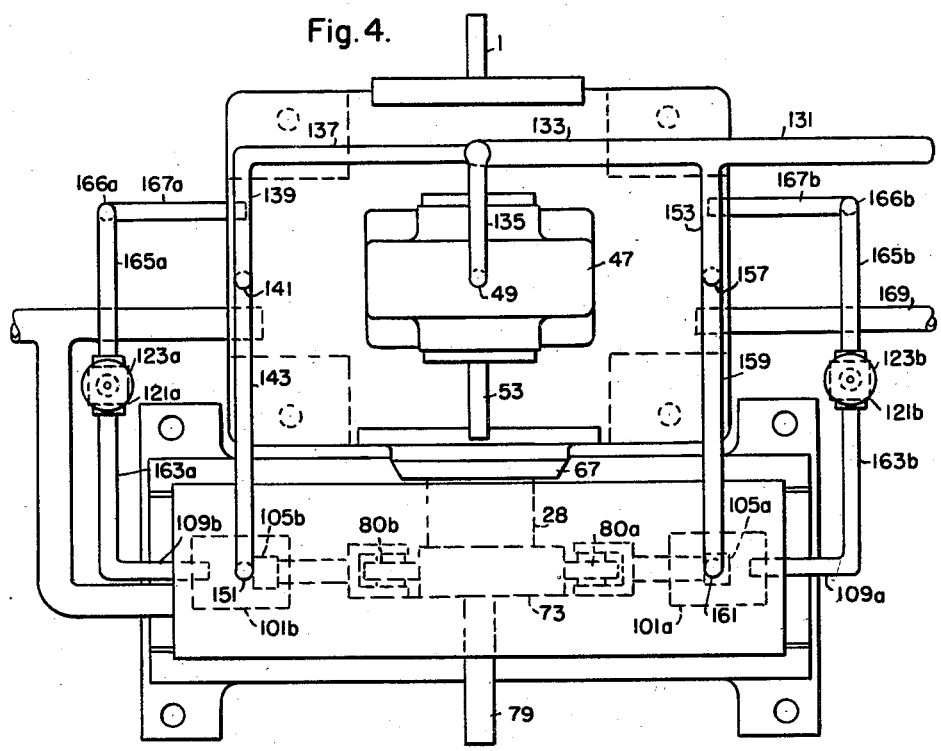
Figs. 4 and 5 are respectively a top plan view and a front elevation of the composite mechanism illustrated in Figs. 1, 2 and 3 which additionally show hydraulic piping necessary to provide a complete operative apparatus.
Figure 5:
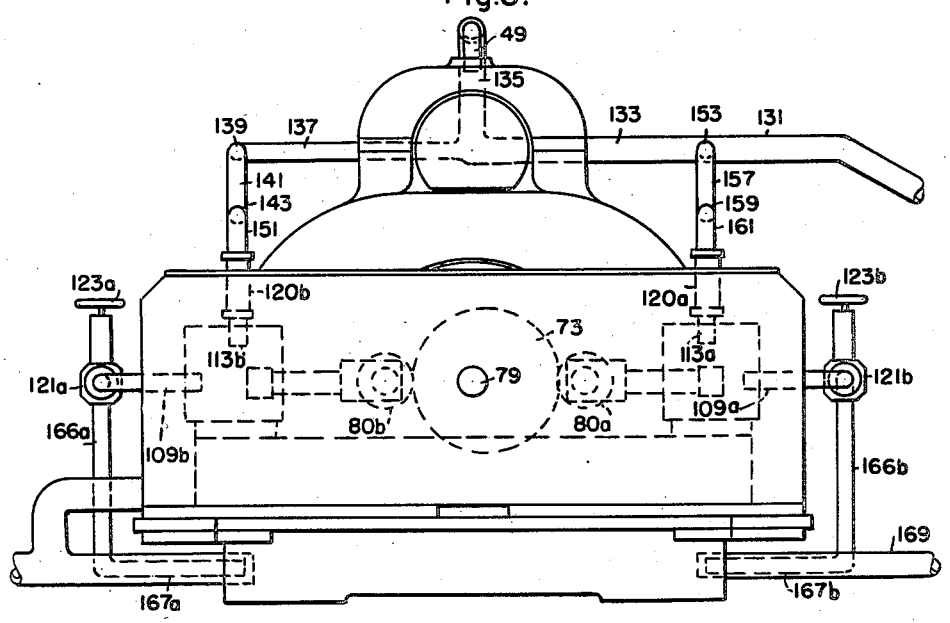

With reference now to Figs. 4 and 5, fluid pressure is provided for inlet conduits 113b through supply conduits 131, 133, 137, 139, 141, 143, and 151 in the order named, and through one-way check valve 120b. Supply pressure for conduit 113a is provided from conduit 131 through conduits 153, 157, 159, and 161 in the order named, a one-way check valve 120a being inserted between conduit 161 and conduit 113a. The one-way check valve should open at a pressure of about one pound per square inch from conduit 161 and should be able to withstand at least three thousand pounds per square inch from the direction of the piston chamber.

Exhaust conduit 109b is in fluid communication with the sump 8 in the bottom of the gear housing through an adjustable valve 121a and drain conduits 166a and 167a. Similarly exhaust conduit 109b drains to the sump through valve 121b and conduits 166b and 167b. A hydraulic pump (not shown) has its suction end connected to sump 8 by means of conduit 169 and its discharge outlet connected to conduit 131. It will be noted also that conduit 133 is connected to the conduit 49 that provides lubrication for the planetary gear drive through conduit 135.

The valves 121a and 121b provide adjustable orifices through which the fluid exhausting from the respective piston chambers through outlet ports 111a and 111b may be metered and/or provided with hand wheels 123a and 123b for varying the cross-sectional area of the orifice.

The operation of the system is as follows: Assuming that a prime mover has been operatively connected to input shaft 1, then rotation of sun gear 29 will drive the planetary gears 31 and, if the ring gear is held stationary, will drive the output shaft 59 through carrier 22, inasmuch as the entire torque imparted to the ring gears will be transmitted to the output shaft thereby. When the ring gear is free to rotate without restraint and a heavy load is on the output shaft, the planteary carrier will remain relatively stationary, and the ring gear will be free to rotate inasmuch as no load has been placed thereon. As will become evident, if one of the lines providing fluid pressure to the piston chambers is blocked or otherwise removed from the fluid system, the condition of no load on the ring gear carrier will be satisfied.

Assuming now that the entire system that has heretofore been described is connected in the manner described, that the supply conduits are under fluid pressure, that the valves 121a and 121b are partially opened so as to meter hydraulic fluid therethrough, that the fluid exhaust lines are connected thereto to the sump 8, then the tendency of the ring carrier to rotate will be opposed by the hydraulic fluid in the piston that is moving outwardly from the eccentric cam. Simultaneously therewith, the check valve will open and hydraulic fluid will flow into the chamber of the piston moving inwardly toward the same under the impetus of the appropriate coil spring 97a or 97b. As will be appreciated from an inspection of Fig. 2, the piston 105a is shown at top dead center driving fluid from its piston chamber, while piston 105b is at the bottom of its suction stroke. As the eccentric cam continues to rotate, piston 105b will be on its pressure stroke and piston 105a will be on its suction stroke and the orifice presented by valve 121a will determine the rotational speed of the ring gear.

Inasmuch as the rotational speed of the ring gear varies as an inverse function of the rotational speed of the planetary gear carrier and of the output of the shaft, the orifice presented by the valves 121a and 121b will determine the rotational speed of the output shaft.

In order to avoid a ragged speed characteristic which could produce undesirable vibration in the coupling system heretofore described, it is apparent that the orifices of valves 121a and 121b should be adjusted so that essentially the same opposition to rotation of the ring gear is provided on each half cycle of rotation of the eccentric cam. Additionally, inasmuch as the valves 121a, 121b, 120a and 120b, and the hydraulic fittings between these valves and the piston chambers are under extreme hydraulic pressures, generally in the vicinity of three thousand pounds per square inch, it is highly desirable that the length of the conduits 109a, 109b, 113a, and 113b be as short as possible.

Figure 6:
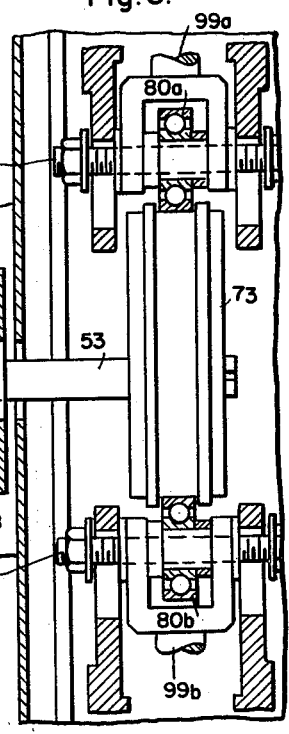
Fig. 6 is a partial top sectional view which serves to illustrate another embodiment of our invention.

The embodiment illustrated by Fig. 6 is similar to that described heretofore, the exception being that the eccentric cam 73 is connected to the output portion of the shaft of pinion 45. The construction and operation of the pistons and the means connecting the piston to the eccentric cams is exactly the same as has been described with reference to the first embodiment. The advantage of this embodiment is that there is a torque multiplication between the rotation restraining means and the ring gear which makes possible a much smaller and less expensive ring-gear rotation restraining means.

The coupling system has been found to be quite efficient in operation, and inasmuch as virtually all of the energy necessary to restrain movement of the ring gear is transferred to the hydraulic fluid, no external cooling source for the fluid has been found to be necessary. The system is trouble-free and practically devoid of maintenance troubles.

Although the invention has been described with reference to certain specific embodiments thereof, numerous modifications falling within the spirit and scope of the invention are possible. Consequently, the specific embodiments herein disclosed are to be interpreted in an illustrative rather than in a limiting sense.

We claim as our invention:

1. In a variable speed mechanism comprising a rotatable ring gear, a sun gear, and a plurality of cooperating planet gears therebetween, said sun gear being adapted to be driven by an input shaft and said planet gears being adapted to drive an output shaft: an eccentric cam driven by said ring gear; at least one piston cylinder having an inlet port, an outlet port, and a piston adapted for reciprocating motion therein; a roller member in rolling contact with the surface of said cam connected to said piston through a rigid coupling and spring biased to contact with said cam surface such that said piston will reciprocate within said housing in accordance with the instantaneous position of said roller member relative to the center of rotation of said cam; one-way check valve means in the supply conduit to said inlet port adapted to admit hydraulic fluid to said cylinder when said piston is driven in one direction and to cut off flow from said cylinder through said inlet port when said piston is driven in the other direction, and an adjustable orifice means in the hydraulic exhaust line from said exhaust port adapted to meter fluid flow from said cylinder so as to exert an adjustable back pressure on said cylinder when said piston is driven in said other direction.

2. In a variable speed mechanism including a driving member, a driven member, a rotatable reaction member, all coupled together so that the ratio of the rotational speed of said driven member relative to that of said driving member is determined by the rotational speed of said reaction member, and an eccentric cam driven by said reaction member: a pair of opposed piston cylinders on opposite sides in line with the rotational center of said eccentric cam; a piston in each of said cylinders driven by a roller member in rolling contact with the surface of said cam so that said pistons reciprocate within their cylinders; each of said cylinders having an inlet port and an exhaust port; a one-way check valve in the hydraulic line leading to said inlet port, and an adjustable orifice in the exhaust line from said exhaust port.

3. In a variable speed mechanism including a driving member, a driven member, a rotatable reaction member, all coupled together so that the ratio of the rotational speed of said driven member relative to that of said driving member is determined by the rotational speed of said reaction member; an eccentric cam driven by said reaction member; a pair of opposed piston cylinders on opposite sides of said cam in line with the rotational center of said eccentric cam; a piston in each of said cylinders driven by a roller member in rolling contact with the surface of said cam so that said pistons reciprocate within their cylinders; each of said cylinders having an inlet port and an exhaust port; a source of fluid pressure; a one-way check valve in series hydraulic connection to said inlet port and an adjustable orifice in series hydraulic connection to said outlet port.

4. In a variable speed mechanism including a driving member, a driven member, a rotatable reaction member, all coupled together so that the ratio of the rotational speed of said driven member relative to that of said driving member is determined by the rotational speed of said reaction member; and an eccentric cam driven by said reaction member; a plurality of opposed piston cylinders on opposite sides of said cam in line with the rotational center of said eccentric cam; a piston in each of said cylinders integral with a piston rod; a U-shaped member having a crossover section between a pair of substantially parallel arms drilled to receive a shaft substantially parallel to said crossover section; said piston rod having a reduced section in press-fit with a hole drilled through said crossover section; a roller member affixed to said shaft and adapted to roll about the outer periphery of said cam; means biasing said roller member against said periphery of said cam so that said pistons reciprocate within their cylinders as said cam rotates; each of said cylinders having an inlet port and an exhaust port; a one-way check valve in series hydraulic connection to said inlet port and an adjustable orifice in series hydraulic connection to said outlet port.

5. In a variable speed mechanism comprising a rotatable ring gear, a sun gear, and a plurality of cooperating planet gears therebetween, said sun gear being connected to an input shaft so as to be driven thereby, said planet gears being adapted to drive an output shaft: an oil sump, fluid pressure port means for supplying pressurized oil to said ring gear, said planet gears and said sun gear for lubrication thereof; an eccentric cam driven by said ring gear; a plurality of piston cylinders and housings; a piston in each of said cylinders positioned for reciprocation radially of the axis of rotation of said cam; each of said pistons having a clevis affixed thereto at the cam end thereof, said clevis having a bight and a pair of substantially parallel arms, said arms having parallel openings therein to receive a shaft positioned substantially parallel to said bight, each piston cylinder housing having slots for receiving said shaft for allowing said shaft limited movement radially of said cam axis, a roller member between said clevis arms and affixed to said shaft so as to roll about the outer periphery of said cam, spring means bearing against said cylinder and biasing said roller member against said periphery of said cam so that said each piston reciprocates within its cylinder as said cam rotates; each of said cylinders having an inlet port and an exhaust port; check valve means in each of said inlet ports coupling said inlet ports to said fluid pressure port for admission of oil under hydraulic pressure to each cylinder except when the piston corresponding thereto is moving outwardly from said cam axis; and adjustable orifice means metering the output fluid from each of said outlet ports to said sump.

6. In a variable speed mechanism comprising a rotatable ring gear, a sun gear and a plurality of cooperating planet gears therebetween, said sun gear being connected to an input shaft so as to be driven thereby, said planet gears being adapted to drive an output shaft: an eccentric cam driven by said ring gear; a plurality of piston cylinders and housings; a piston in each of said cylinders positioned for reciprocation radially of the axis of rotation of said cam; each of said pistons having a clevis affixed thereto at the cam end thereof, said clevis having a bight and a pair of substantially parallel arms, said arms having parallel openings therein to receive a shaft positioned substantially parallel to said bight, each cylinder piston housing having slots for receiving said shaft for allowing said shaft limited movement radially of said cam axis, a roller member between said clevis arms and affixed to said shaft so as to roll about the outer periphery of said cam, spring means bearing against said cylinder and biasing said roller member against said periphery of said cam so that said pistons reciprocate within their cylinders as said cam rotates; each of said cylinders having an inlet port and an exhaust port; check valve means in each of said inlet ports for admission of fluid under hydraulic pressure to the cylinder corresponding thereto except when the piston corresponding thereto is moving outwardly from said cam axis, and adjustable orifice means metering the output fluid from each of said exhaust ports.

References Cited in the file of this patent

UNITED STATES PATENTS

| | | |
|---|---|---|
| 212,777 | Wolf | Feb. 25, 1879 |
| 561,225 | Henry | June 2, 1896 |
| 1,435,499 | Ricker | Nov. 14, 1922 |
| 1,471,921 | Root | Oct. 23, 1923 |
| 1,747,497 | Weylandt | Feb. 18, 1930 |
| 1,850,083 | Noltein | Mar. 22, 1932 |
| 2,191,907 | De Flippis | Feb. 27, 1940 |
| 2,377,199 | Adams et al. | May 29, 1945 |

FOREIGN PATENTS

| | | |
|---|---|---|
| 43,005 | Denmark | Sept. 22, 1930 |
| 352,625 | France | Aug. 16, 1905 |
| 558,149 | Great Britain | Dec. 23, 1943 |